Nov. 13, 1956 M. NELLES 2,770,113
FLEXIBLE COUPLING
Filed Oct. 26, 1953
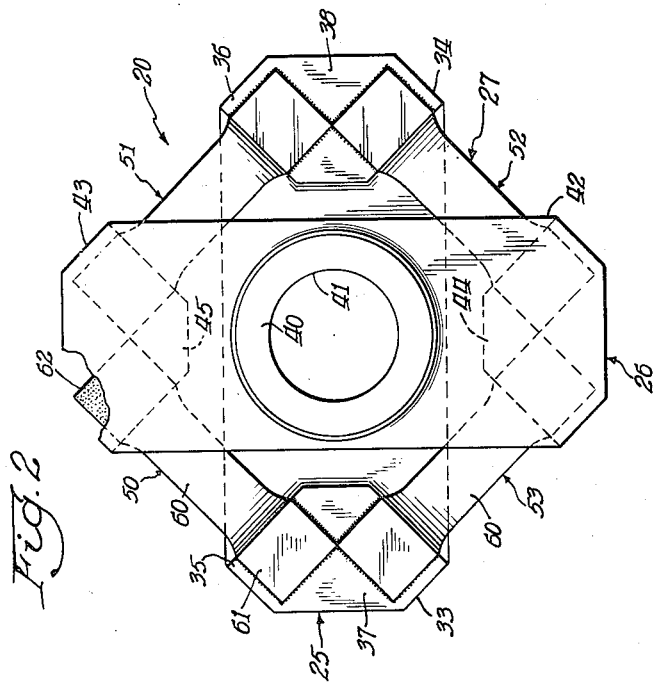
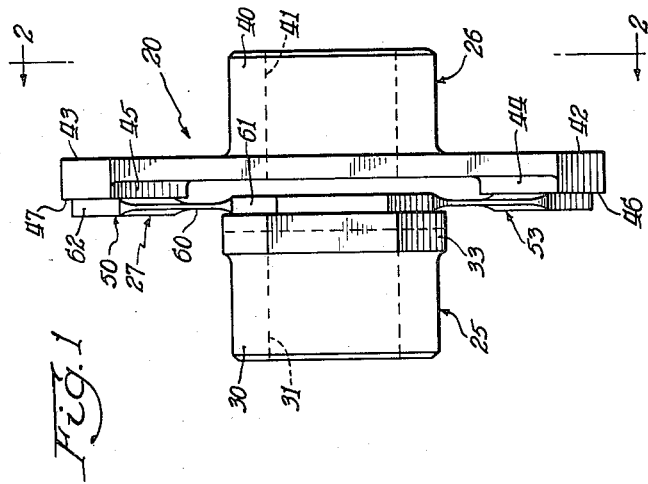
Inventor:
Maurice Nelles
By Joseph M. Gartner
Atty.

United States Patent Office 2,770,113
Patented Nov. 13, 1956

2,770,113

FLEXIBLE COUPLING

Maurice Nelles, Elmhurst, Ill., assignor to Borg-Warner Corporation, Chicago, Ill., a corporation of Illinois Application October 26, 1953, Serial No. 388,350

2 Claims. (Cl. 64—12)

This invention relates, in general, to flexible couplings, and is particularly concerned with couplings of the type characterized as having incorporated therein a flexible center formed either of metal or rubber.

Otherwise stated, the invention is embodied in a flexible coupling having a pair of axially spaced hubs with flanged portions thereof disposed in confronting relationship, and flexible means interconnecting the confronting flanges providing relatively soft axial movement and yet withstanding relatively high operating deflection and angular or parallel misalignment to which the flexible coupling may be subjected.

An important object and accomplishment of the invention is to provide a flexible coupling wherein torque is transmitted from one flanged hub to a second flanged hub through flexible means interconnecting said flanged hubs providing a flexible coupling capable of withstanding relatively high static torque and yet accommodating angular misalignment of the respective flanged members.

Another object and accomplishment of the invention is to provide a flexible coupling particularly adaptable to applications wherein it is desirable to have a relatively soft axial displacement and yet provide for substantial load carrying characteristics under static torque.

An ancillary object and accomplishment of the invention is to provide a new and improved flexible coupling which is adapted to be economically manufactured and which is so designed as to permit the manufacture and assembly thereof in accordance with present day large scale mass production methods of construction and assembly.

The invention seeks, as a final object and accomplishment, to provide a flexible coupling particularly characterized by a design arrangement to more advantageously and satisfactorily perform the functions required of it and adapted to provide a compact unit which will successfully combine the factors of structural simplicity and durability, and yet be economical to manufacture.

Additional objects, features and advantages of the invention disclosed herein will be apparent to persons skilled in the art after the construction and operation are understood from the within description.

It is preferred to accomplish the various objects of this invention and to practice the same in substantially the manner as more fully described herein, and as more particularly pointed out in the appended claims.

Embodiments of the invention are illustrated in the accompanying drawings forming a part hereof and wherein:

Fig. 1 is a side elevational view of a flexible coupling embodying the features of the present invention; and Fig. 2 is an end elevational view of the flexible coupling depicted in Fig. 1 and being taken substantially on the plane of the line 2—2 in Fig. 1.

The drawings are to be understood to be more or less of a schematic character for the purpose of illustrating and disclosing a preferred form of the improvements contemplated herein, and in the drawings like reference characters identify the same parts in the several views.

In the exemplary embodiment of the invention depicted in Figs. 1 and 2, I have illustrated the flexible coupling with which the present invention is particularly concerned as being designated in its entirety by the numeral 20 and comprising, in general, a flanged member 25 and a flanged member 26 each being disposed in confronting relationship with respect to each other, and flexible means 27 interconnecting the flanged members 25 and 26 affording relatively soft axial movement and relatively high operating deflection and allowing angular or parallel misalignment of the flanged members 25 and 26.

In accordance with the construction of the present invention, the flanged members 25 and 26 are of identical construction. In adverting to Figs. 1 and 2, it may be seen that the flanged member 25 is provided with a hub 30 having a central through bore 31 adapted to accommodate a shaft (not shown), said hub 30 having integrally formed therewith flanges 33 and 34 projecting radially outwardly in opposite directions as shown. The extreme outer ends of the flanges 33 and 34 are provided respectively with axially projecting portions respectively indicated at 35 and 36 and each defining a relatively flat surface respectively indicated as at 37 and 38.

The flanged member 26 being of identical construction to the flanged member 25 hereinabove described comprises a hub 40 having a through aperture 41 adapted to accommodate a shaft (not shown), said hub being provided with integral flanges 42 and 43 projecting radially outwardly from the hub in opposite directions with the extreme ends thereof respectively providing axially projecting portions 44 and 45 each defining relatively flat surfaces respectively indicated at 46 and 47.

Having thus described in detail the general construction of the flanged members 25 and 26, the important flexible interconnecting means 27 disposed between said flanged members will now be described in detail.

As may be best seen in Figs. 1 and 2, the flexible interconnecting means 27 comprises a plurality of link-like elements 50, 51, 52 and 53 disposed in an annular array (Fig. 2) with the extreme end portions thereof being respectively secured to opposed flanges of the flanged members 25 and 26.

Each of the link-like elements comprises a relatively thin web 60 interconnecting the extreme ends 61 and 62, said relatively thin web portion being axially deflectable responsive to angular or parallel misalignment of the flanged members 25 and 26. It can be seen in Fig. 2 that the ends as at 61 and 62 of each of the link-like elements are secured to opposed flanges of the flanged elements 25 and 26. For example (Fig. 2) the end 61 of the link-like element 50 is secured to the surface 37 of the flange 33 of the flanged element 25 while the opposite end 62 of the link-like element is secured to the surface 47 of the flange 43 of the flanged element 26.

It is notable that the link-like elements as at 50 may be formed as shown of metal or rubber or of other materials having similar resilient and flexible characteristics. In the event that the link-like elements are formed of metal the extreme ends will be secured to respective flanges of the flanged elements 25 and 26 by brazing or the like. If rubber link-like elements are employed the ends may be suitably bonded or otherwise secured in their respective positions as shown. Of course, metallic link-like elements would be capable of carrying heavier static torque loads but in other applications it may be desirable to employ rubber so as to provide relatively soft axial deflection and angular misalignment. In any event, it is notable that the unique disposition of the link-like elements will accommodate relatively high static torque loads and yet provide the desirable characteristics for accommodating axial and angular misalignment.

Because of its simple and symmetrical construction, the flexible coupling contemplated herein is economical to manufacture and is readily adaptable to mass production manufacturing methods.

From the foregoing disclosure, it may be observed that I have provided a flexible coupling which efficiently fulfills the objects as hereinbefore set forth and provides numerous advantages which may be summarized as follows:

1. Structurally simple, efficient and durable;
2. Economical to manufacture and readily adaptable to mass production manufacturing principles; and
3. The provision of a flexible coupling providing relatively soft axial movement and yet withstanding relatively high operating deflection and angular or parallel misalignment to which the flexible coupling may be employed.

While I have illustrated a preferred embodiment of my invention, many modifications may be made without departing from the spirit of the invention, and I do not wish to be limited to the precise details of construction set forth but wish to avail myself of all changes within the scope of the appended claims.

I claim:

1. A flexible coupling for shafts comprising, a pair of flanged hub members disposed in spaced confronting relationship with respect to each other, and flexible interconnecting means disposed between said flanged members comprising a plurality of rubber link-like elements disposed in an annular array with the extreme end portions thereof being respectively immovably bonded directly to opposed flanges of said flanged members, each of said link-like elements comprising a narrow web interconnecting wide flat ends thereof, said web being axially deflectable responsive to angular or parallel misalignment of the flanged members.

2. A flexible coupling for shafts comprising a pair of flanged hub members disposed in spaced confronting relationship with respect to each other and flexible interconnecting means disposed between said flanged members comprising a plurality of rubber link-like elements disposed in an annular array with the extreme end portions thereof being immovably bonded directly to opposed flanges of said flanged members, each of said rubber link-like elements comprising a web interconnecting the extreme ends thereof, the cross-section area of the web being less than the cross-sectional area of the extreme ends, said web being axially deflectable responsive to angular or parallel misalignment of the flanged members.

References Cited in the file of this patent

UNITED STATES PATENTS

| 1,025,875 | Lambert | May 7, 1912 |
| 1,499,371 | Kesley | July 1, 1924 |
| 2,580,781 | Hoffer | Jan. 1, 1952 |

FOREIGN PATENTS

| 628,664 | Great Britain | Sept. 2, 1949 |
| 696,731 | Great Britain | Sept. 9, 1951 |